CHARACTER RECOGNITION METHOD AND APPARATUS

Filed Dec. 11, 1964 8 Sheets-Sheet 1

INVENTOR
SERGEI M. FOMENKO
BY
Abraham Wasserman
ATTORNEY

INVENTOR
SERGEI M. FOMENKO
BY
ATTORNEY

CHARACTER RECOGNITION METHOD AND APPARATUS

Filed Dec. 11, 1964 8 Sheets-Sheet 3

INVENTOR
SERGEI M. FOMENKO
BY
Abraham Wasserman
ATTORNEY

INVENTOR
SERGEI M. FOMENKO
BY
Abraham Wotterman
ATTORNEY

CHARACTER RECOGNITION METHOD AND APPARATUS

Filed Dec. 11, 1964 8 Sheets-Sheet 6

INVENTOR
SERGEI M. FOMENKO
BY
Abraham Wassema
ATTORNEY

INVENTOR
SERGEI M. FOMENKO
BY
Abraham Wasserman
ATTORNEY

CHARACTER RECOGNITION METHOD AND APPARATUS

Filed Dec. 11, 1964 8 Sheets-Sheet 8

INVENTOR
SERGEI M. FOMENKO
BY
Abraham Wasserman
ATTORNEY

United States Patent Office 3,346,845
Patented Oct. 10, 1967

3,346,845
CHARACTER RECOGNITION METHOD AND APPARATUS

Sergei M. Fomenko, Woodland Hills, Calif., assignor to The Bunker-Ramo Corporation, Stamford, Conn., a corporation of Delaware Filed Dec. 11, 1964, Ser. No. 417,749
8 Claims. (Cl. 340—146.3)

This invention generally relates to a method and apparatus for character recognition and more particularly to a novel method and apparatus utilizing scanning techniques for developing character signal functions utilized in the recognition of characters.

In recent years, great progress has been accomplished in the fields of automatic data processing. High speed computers with their associated electronic memories are presently used in the development of large-scale information selection and retrieval systems which, in a sense, delegate to machines the routine tasks of identifying input information, comparing it with data stored in the memories of such machines, and then producing appropriate output data. Similarly, extensive research and development is taking place in the art of automated mechanized translation, and the science of linguistics with the ultimate goal being a system which will automatically translate information from one language into another. However, before machines may be used to perform any of the foregoing tasks, the information supplied to such machines must be transcribed from typed or printed form to a form directly usable by the machines. From a system standpoint, such requirements, if manually performed, pose a critical problem to the over-all efficiency of the system, since manual transcribing is slow compared to the high speed capabilities of present day systems. In the prior art, automatic character recognition techniques for transcribing data from typed or printed form to a form directly usable by machines have been developed in order to increase the over-all speed of data processing systems. In general, such automatic techniques are utilized in systems that derive image patterns or optical signal characteristics of each character to be recognized. The signals or image patterns so derived are then compared with sets of reference patterns or signals which represent known characters. Upon matching the patterns or the signals, an output signal is produced which represents the particular input character that has been recognized.

One presently available character recognition system employs template matching techniques whereby each of a group of character templates is matched with the character to be recognized, perfect matching resulting in an output signal. In another method, the image field of the character to be recognized is divided into sub-areas and the recognition of those sub-areas containing a portion of the character is used to identify the character in this image field. In still another system, the horizontal, vertical and curved lines of a character are analyzed, which permits recognizing the character.

The previously described systems, however, though representing an advantage over manual character transcription, are still quite limited in that the positioning of the characters to be recognized in the apparatus is most critical. Many of the systems are based on geometric matching techniques so that any misalignment in the matching process may result in erroneous character identification. Further, some of the techniques are limited to a relatively small number of identifiable characters since the over-all dimensions and particular character line widths are used as the identifying criteria, thereby limiting the system to points of fixed dimensions, shapes and line widths.

However, in accordance with the present invention, a method and apparatus are disclosed which greatly minimize the character alignment requirements in the system, and further enable the recognition of alphanumeric characters in a variety of fonts, thereby greatly increasing the recognition capacity of the system.

The method and apparatus of the present invention incorporate a high speed and highly accurate automatic character recognition system which is comparable with the input data requirements of the data processing systems presently in use or under contemplation.

Briefly, the present invention of automatic character recognition is based on character scanning techniques which develop character profiling and internal structural information as a function of scanning line analysis.

In accordance with the teachings of the present invention, a character in a line of text, once its leading edge is automatically detected, as will be described hereinafter, is scanned by sequentially generated parallel scanning lines which sweep across a frame of reference encompassing the character in directions perpendicular to the line of text which includes the character to be recognized. The intensity of the scanning spot is modulated by the difference in optical transmissivity of the character and the material on which it is printed, thus producing video signals which are used to relate the distances or lengths of the scanning lines from beginnings thereof to the points of first intersection with a character, thereby producing a series of upper profile functions. Similarly, the video signals are used to relate the lengths of the scanning lines from the points of last intersections of the lines with a character to the ends of the scanning lines, thereby producing a series of lower profile functions. Further, the video signals are used to derive information which is characteristic of the internal structure of a character by detecting the number of times each scanning line crosses over character details, producing internal structure functions. For example, by scanning the character Z with three equally spaced lines, which are longer than the height of the character, the upper and lower profile functions will all be equal since the top and bottom profiles of the character Z are perpendicular to the direction of the scanning lines, so that all the distances from the beginnings of the lines to the points of first intersections with the character are equal. Similarly, the distances from the last points of character intersection to the ends of the lines are equal. However, the internal structure functions generated by the three lines will differ, since the first and third scanning lines intersect the character details only in two places, while the second scanning line intersects the character in three places. The internal structure functions may be regarded as crossing functions since they represent the number of times each scanning line crosses character detail.

According to the teachings of the present invention, upper and lower profile functions and crossings functions which are generated by scanning a character are sufficient to distinguish between the majority of characters of a given alphabet. However, it has been found that some characters, as for example the "a" and "g" of the lower case Financial Gothic Alphabet, generate the same profiles and crossings functions, so that ambiguity may result in distinguishing between such characters if only their profile functions and crossings functions were used as the distinguishing criteria.

Therefore, in another embodiment of the present invention, which is adapted for the automatic recognition of characters of the lower case Financial Gothic Alphabet, a character spacing function is generated during the scanning of each character in addition to the profiles and crossings functions described above. The character spacing function indicates the distance between any specified crossings of a given scanning line within the series of lines that scan a single character, to determine if the distance between such crossings is longer or shorter than a predetermined reference. This additional character information together with the profiles and crossings functions represent sufficient signals to clearly identify each character which generated them, eliminating any possible ambiguity in the recognition process.

According to the teachings of the present invention, the upper profile functions, the lower profile functions, the internal structure functions and character spacing functions for all possible characters to be recognized are derived in advance and stored in a memory. Then, during the recognition process, the functions derived from scanning an unknown character are generated, recognition of the unknown character being accomplished by matching the generated signal functions with the previously stored signal functions which represent known characters, thereby identifying the unknown character.

For a better understanding of the invention, reference is made in the following description to the accompanying drawings in which.

Figure 8:
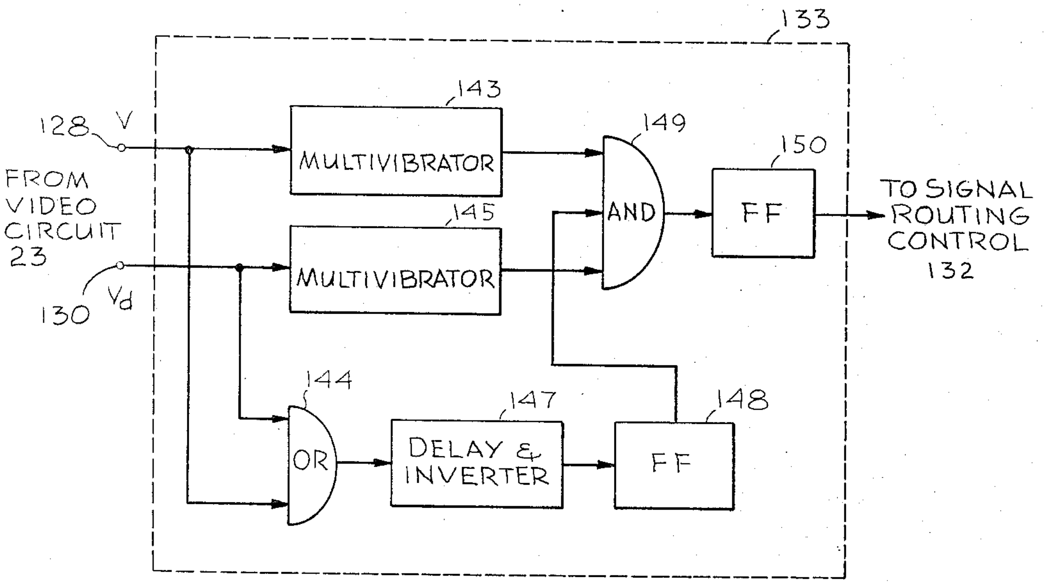
FIGURE 8 is a block diagram of an upper profile function generator shown in FIGURE 7.
Figure 7:
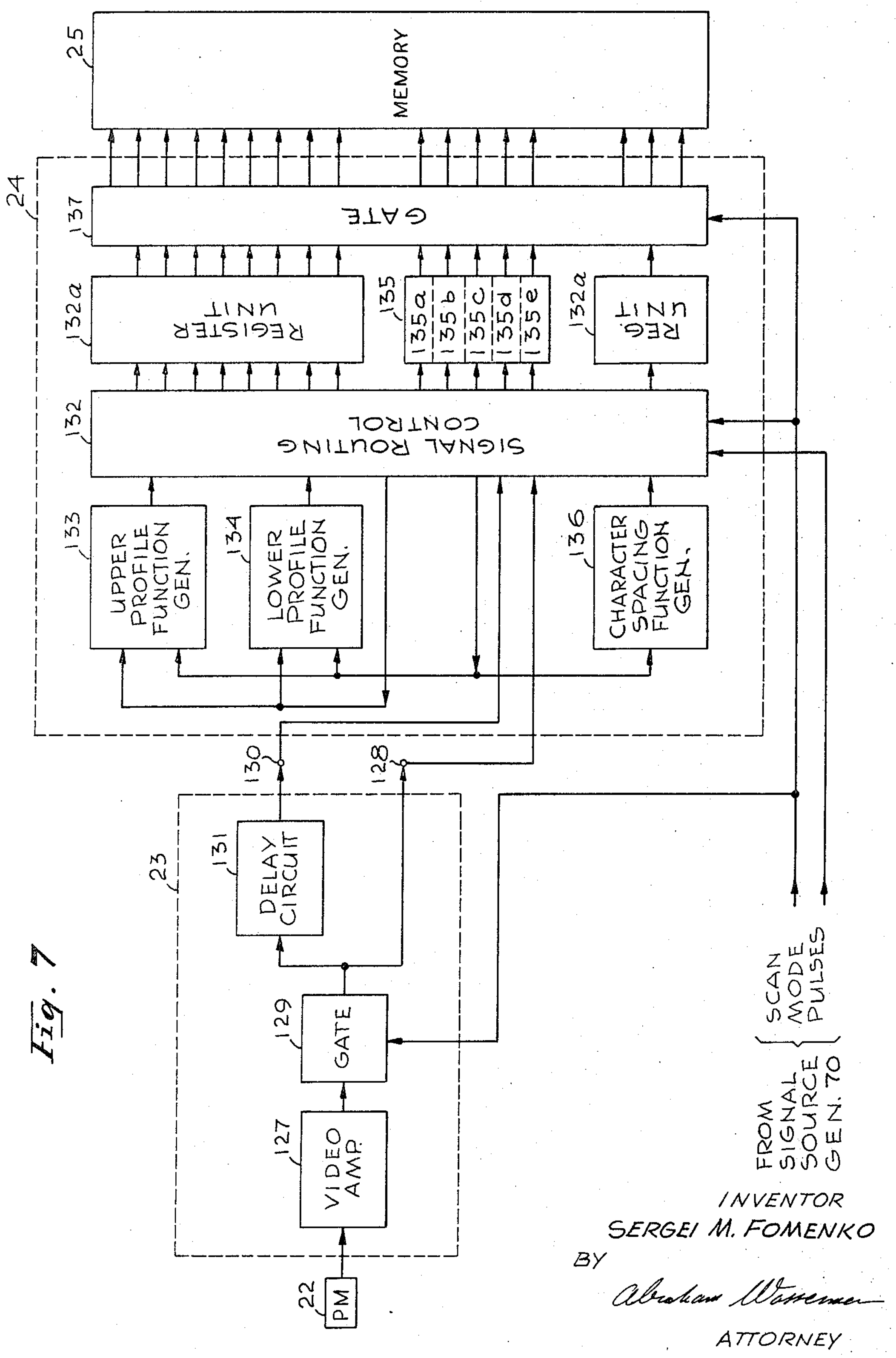
FIGURE 7 is a block diagram of a portion of the circuitry shown in FIGURE 1.
Figures 9A, 9B:
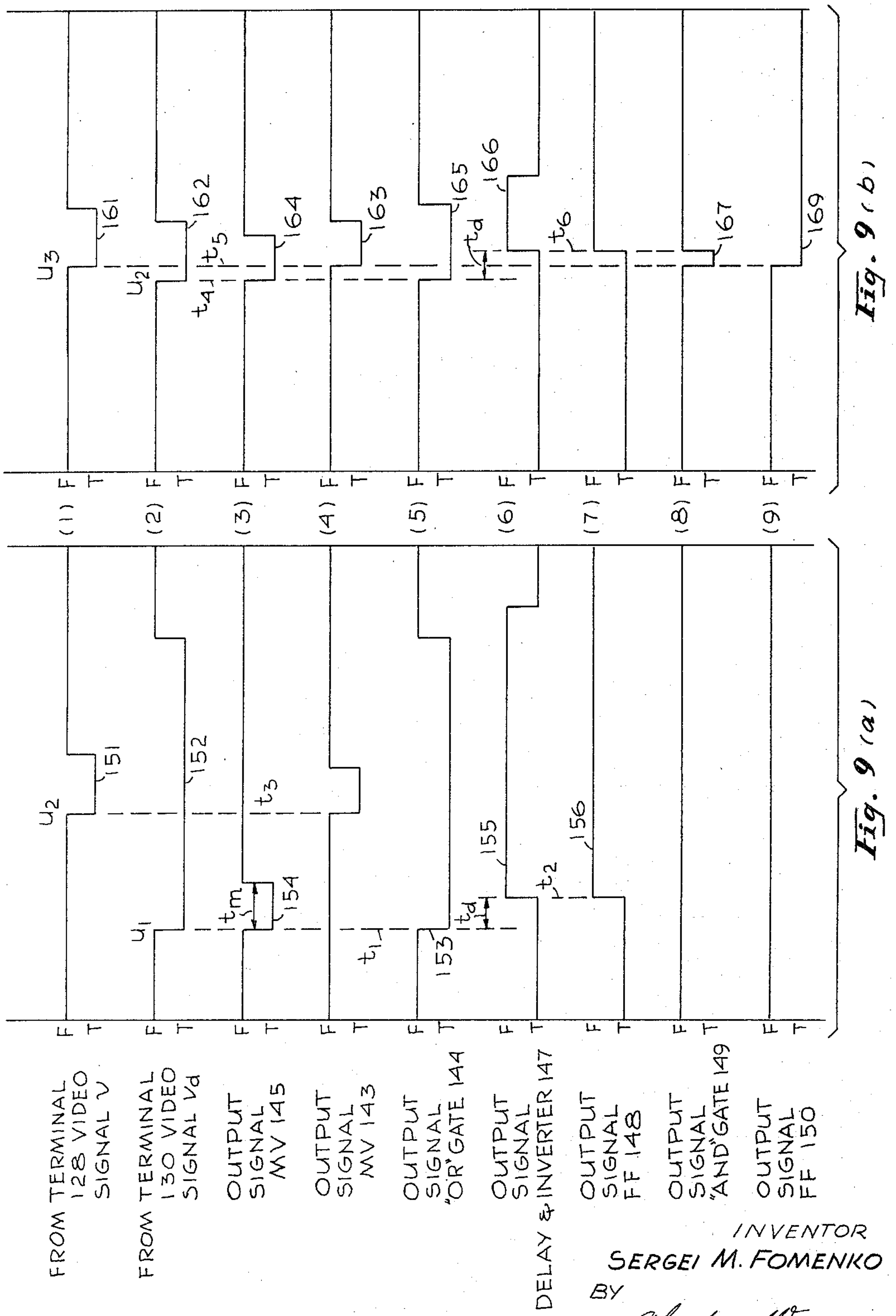
Figure 10:
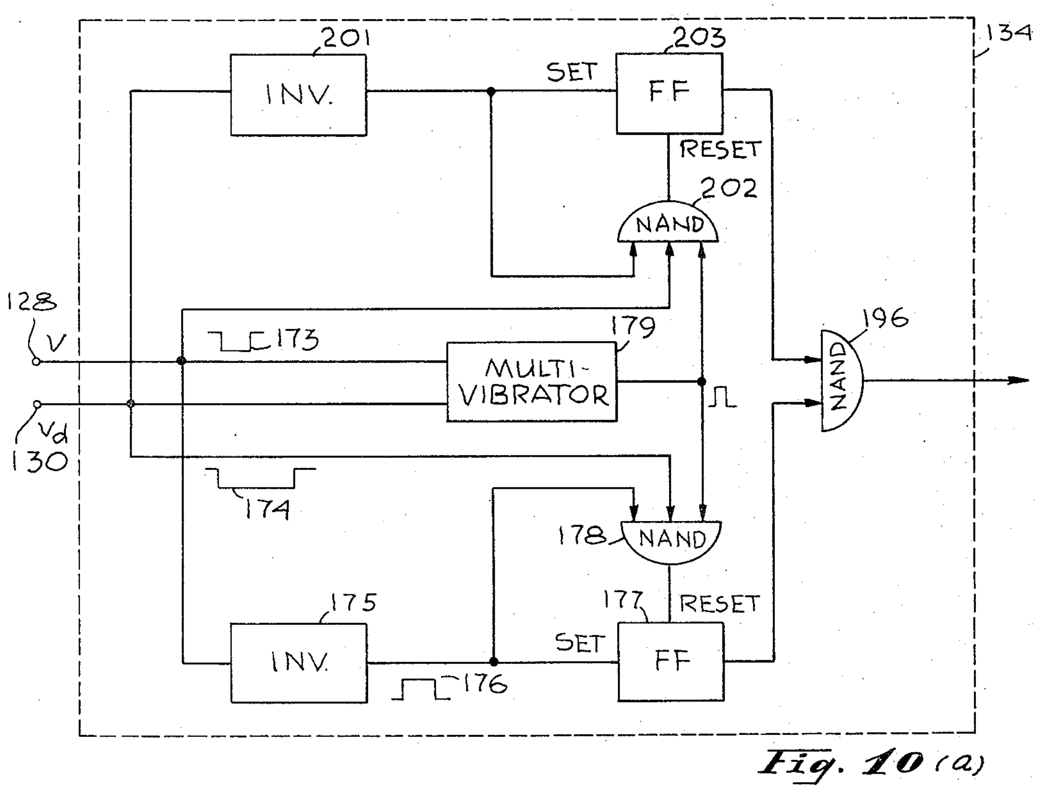
Figure 10:
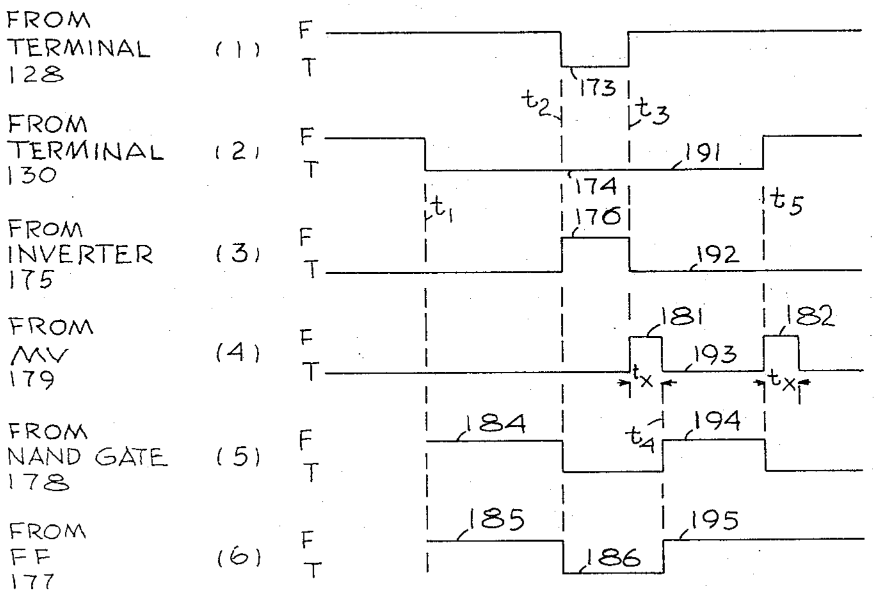
Figure 11A:
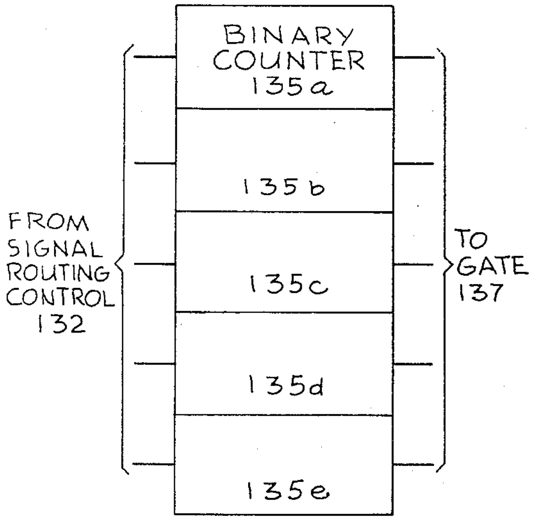
Figure 11B:
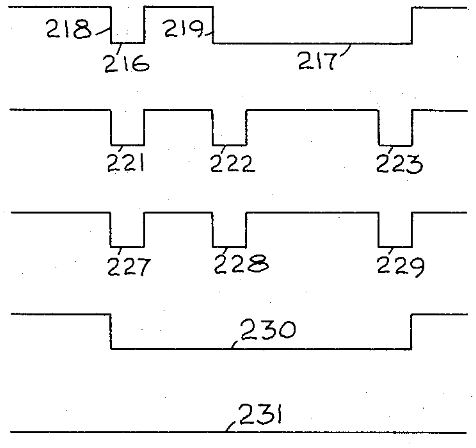
Figure 12A:
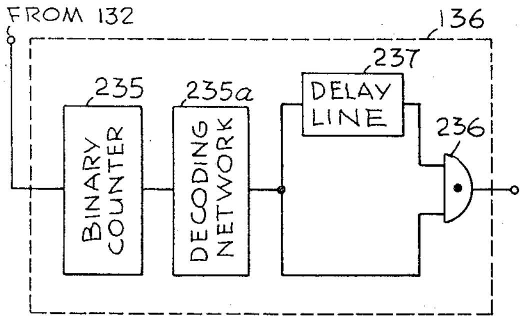
Figure 12B:
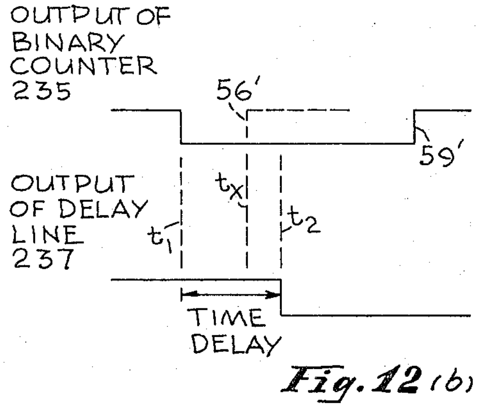
Figure 13:
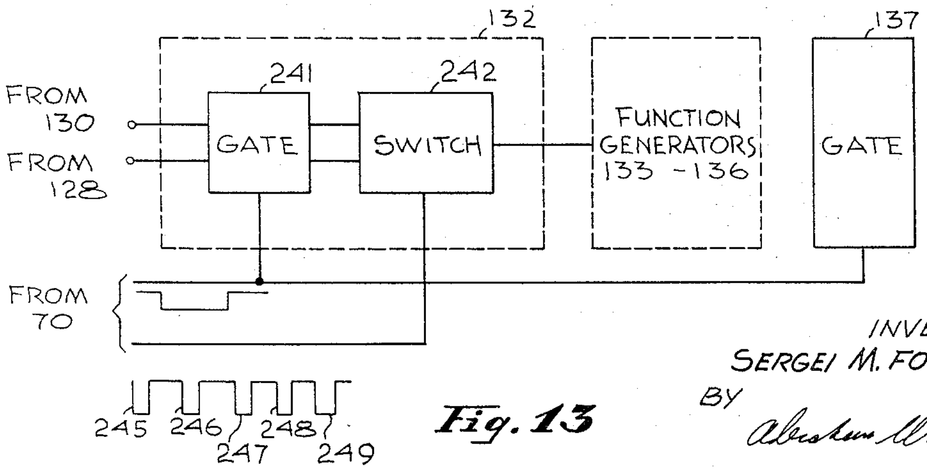

FIGURES 9*a* and 9*b* represent waveforms useful in explaining the operation of the upper profile function generator of FIGURE 8;

FIGURE 10*a* is a block diagram of a lower profile function generator;

FIGURE 10*b* represents waveforms useful in explaining the operation of the lower profile function generator;

FIGURE 11*a* is a block diagram of an internal structure function generator;

FIGURE 11*b* represents waveforms useful in explaining the operation of the generator of FIGURE 11*a*;

FIGURE 12*a* is a block diagram of a character crossings spacing function generator incorporated in another embodiment of the present invention;

FIGURE 12*b* represents waveforms useful in explaining the operation of the generator of FIGURE 12*a*; and FIGURE 13 is a partial block diagram of the circuitry shown in FIGURE 7.

Figure 1:
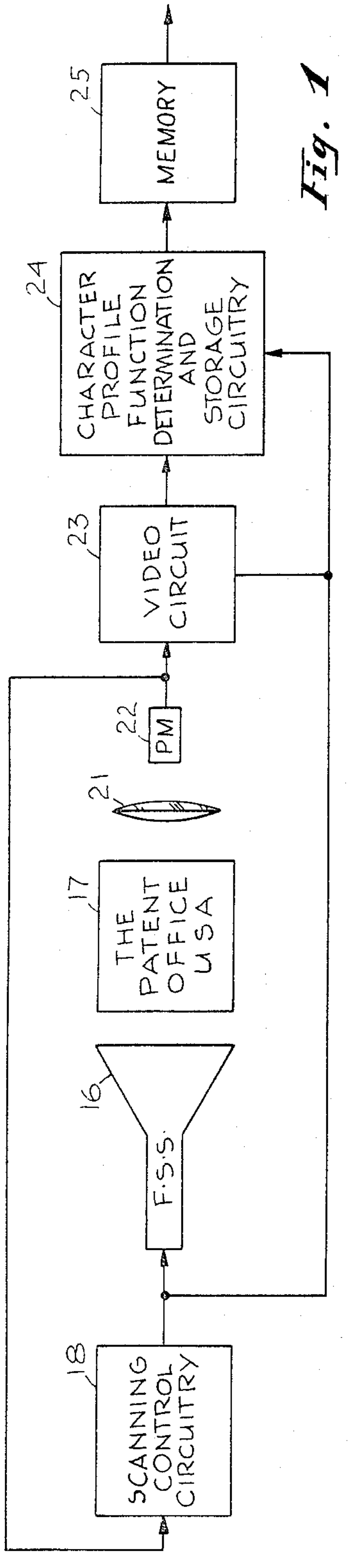
FIGURE 1 is a most general block diagram of the invention.

Reference is now made to FIGURE 1, which is a simplified block diagram of one embodiment of the present invention. There is shown a light source 16, such as a flying spot scanner or a similar device which is easily adaptable to electronic scanning and switching techniques. The light source 16 provides an intense small spot of light that moves back and forth in a television-like scanning raster, thereby projecting the spot of light in a predetermined scanning pattern on a surface of test material 17, such as a microfilm surface, the pattern being controlled by scanning control circuitry 18. Although the text material 17 will hereinafter be referred to as microfilm, it is to be understood that the invention contemplates the use of other typed or printed surfaces which exhibit differences in the optical transmissivity characteristics of the typed or printed characters and the surface on which they are typed or printed. A lens system 21 and a photomultiplier tube 22 are incorporated in the system of the invention and positioned near the surface of the microfilm 17 so as to be in position to collect the light of the spot of light which is transmitted through the film, producing a corresponding electrical output signal from the photomultiplier tube 22. As the spot of light passes over the text characters, the light intensity collected by the photomultiplier 22 greatly changes due to the different transmissivity characteristics of the characters and their background so that the photomultiplier tube's output signal is modulated by the detail characteristics thereof.

As will be explained hereinafter in greater detail, the light source 16 causes the microfilm surface 17 to be scanned by the light spot in a line scanning pattern with the slow scan in the direction of each of the lines of text and the fast scan in a $y$ direction perpendicular thereto. The entire microfilm surface is scanned one line at a time with a slow overall vertical movement down the surface as each line of text is examined. Once a leading edge of a character is detected, a series of serially generated scanning lines sweep across a frame of reference which includes the entire character pattern. The light intensity of each scanning line is modulated as the line sweeps across the character detail, thereby modulating the output signals of the tube 22, which hereafter will be referred to as video signals. The video signals are serially supplied to a video circuit 23 whose output is connected to a character profile function determination and storage circuit 24, wherein the video signals are used to derive various functions which are representative of the character being scanned. The video signals from the tube 22 are also supplied to the scanning control circuitry 18 to be used therein as control signals. The functions derived in the circuit 24 are temporarily stored therein until the entire series of lines scanning a single character is generated, at which time a signal from the scanning control circuitry 18 causes the functions stored in the circuit 24 to be supplied to a memory 25 in which functions of known characters have been stored. The generated functions produced during the scanning process are compared with the prestored functions and an output signal representative of the particular character which has been scanned is produced.

Figure 2:
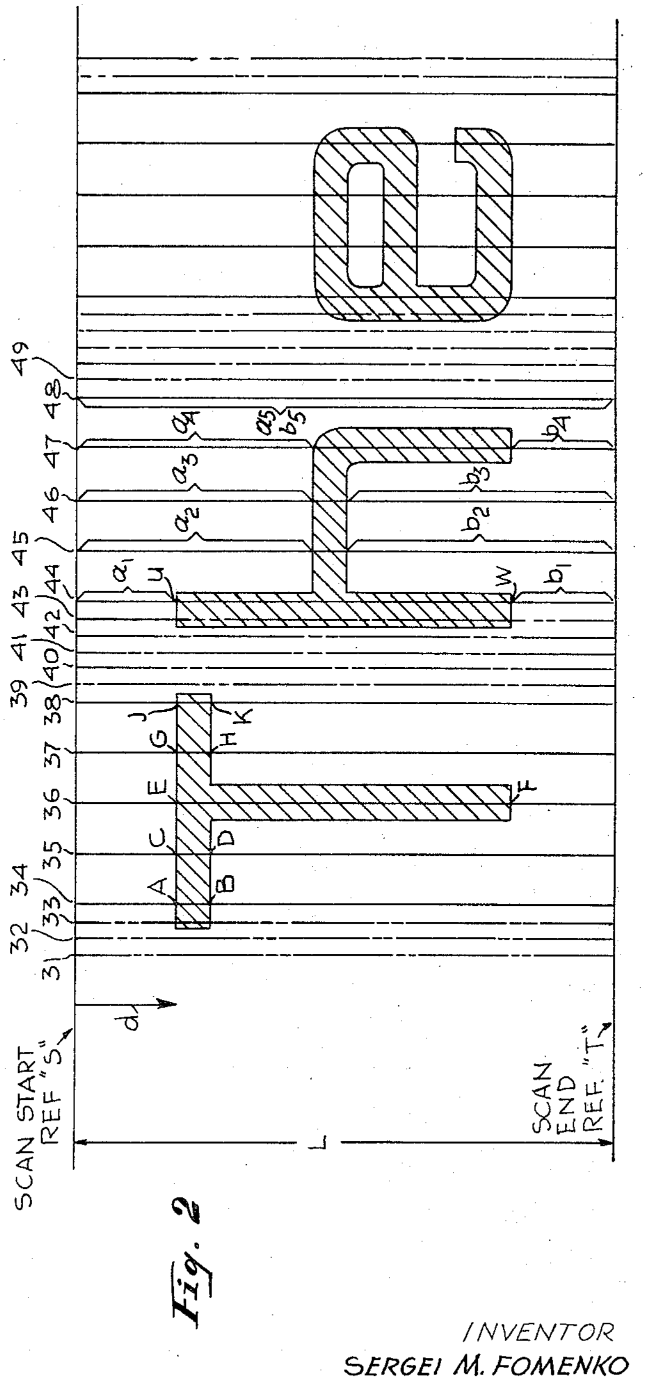
FIGURES 2 and 3 are diagrams useful in ex- in explaining the invention.

Referring now to FIGURE 2, there is shown the first line of the text on the text surface 17 as shown in FIGURE 1. As previously stated, the surface of the text is scanned with the light spot moving across the surface in a series of scanning lines of equal length and in a direction perpendicular to the lines of text, as shown in FIGURE 2. The length of the scanning lines, generally designated by L, may be chosen to be approximately equal to one and a half the maximum height of any character that may be scanned, thereby insuring that the entire character will be within the scanned frame of reference.

As seen in FIGURE 2, a scanning line 31 scans the surface of the text, from a scan-start reference line S to a scan end reference line T, in a downwardly direction indicated by an arrow *d*. Since the line 31 does not intersect character detail, the system will cause the light spot of the scanner 16 to become blanked, return the blanked spot to the scan start reference line S, unblank the spot of light, and cause a second scanning line 32 to scan the surface, the spacing between the lines being equal to substantially one-half the width of any character line. Such spacing is generally referred to as the "search sweep mode." The system will continue to operate in the "search sweep mode" until some character detail is intercepted so that the video signals of photomultiplier 22, which are integrated during each scanning line, exceed a predetermined threshold. Assuming that such is the case as a result of scanning line 33 which is intercepted by the leading edge of the letter "T," the system will cause the scanning to revert to a "profile sweep mode" wherein the spacing between every two of the next five (or less as will be explained hereafter) scanning lines equals one and a half the width of the character lines. Although two specific sweep mode line spacings are described herein, it should be understood that different spacings may be used, and further that the system may be operated in a single sweep mode wherein the spacings between lines in the search and profile sweep modes are substantially equal. In FIGURE 2, scanning line 34 represents the first line in the profile sweep mode. As a result of the scanning line 34 being intercepted by the character detail AB, video signals from the photomultipler 22 (FIGURE 1) are supplied through the video circuit 23 to the circuit 24. Similarly, signals are supplied to circuit 24 as scanning lines 35, 36, 37 and 38 cross the character details CD, EF, GH and JK respectively of the letter T. The scanning line 38, being the fifth line in the profiling sweep mode, causes the system to revert back to the search sweep mode as shown in FIGURE 2, thereby generating closer spaced scanning lines, until a scanning line 43 senses the next character, resetting the system back to the profile sweep mode. The fifth scanning line (line 38) in the profile sweep mode further causes the stored profile information in the circuit 24 to be supplied to the memory 25 so that all the video information derived during the scanning of the character "T" which intersected scanning lines 34 through 38, energizes an appropriate section in the memory 25, thereby producing an output signal which represents the character "T."

The signal information derived and stored in the circuit 24 may best be explained by referring to to the character "h" in FIGURE 2 wherein scanning lines 44 through 48 are shown as scanning the character in the profiling sweep mode. As shown, the first scanning line 44 is divided by the character "h" into two parts, namely, an upper portion $a_1$ which is the portion of the line 44 from its beginning to the point $u$, and a lower portion $b_1$ equaling the line portion from the point $w$ to the end thereof. Similarly, scanning lines 45, 46 and 47 are divided into sections $a_2$, $b_2$; $a_3$, $b_3$ and $a_4$, $b_4$, respectively. The scanning line 48, which is not intersected by the character "h," is indicated as $a_5$ and $b_5$, both being equal to the total line length L. According to the teachings of the present invention, the line portion $a_1$ is compared with line portion $a_2$ generating a first upper profile function $A_1$, which is a function of $a_1$ and $a_2$, Whether $A_1$ is regarded as positive (+), negative (−), or equal to zero depends on the difference between $a_1$ and $a_2$ with respect to an upper profile threshold level $T_a$. The relationships may best be expressed by the following equations:

$$A_1=+ \text{ if } (a_1-a_2)\geqq T_a$$
$$A_1=0 \text{ if } T_a>(a_1-a_2)>-T_a$$
$$A_1=- \text{ if } (a_1-a_2)\leqq -T_a$$

Similarly, three other upper profile functions are generated, their respective values being defined by the following equations:

$$A_2=+ \text{ if } (a_2-a_3)\geqq T_a$$
$$A_2=0 \text{ if } T_a>(a_2-a_3)>-T_a$$
$$A_2=- \text{ if } (a_2-a_3)\leqq -T_a$$
$$A_3=+ \text{ if } (a_3-a_4)\leqq T_a$$
$$A_3=0 \text{ if } T_a>(a_3-a_4)>-T_a$$
$$A_3=- \text{ if } (a_3-a_4)\leqq -T_a$$
$$A_4=+ \text{ if } (a_4-a_5)\geqq T_a$$
$$A_4=0 \text{ if } T_a>(a_4-a_5)>-T_a$$
$$A_4=- \text{ if } (a_4-a_5)\leqq -T_a$$

In a similar manner, four lower profile B functions are generated, the values assigned to $B_1$, $B_2$, $B_3$ and $B_4$ being functions of $b_1$, $b_2$, $b_3$, $b_4$ and a lower profile threshold level $T_b$. The relationships may best be defined by the following equations:

$$B_1=+ \text{ if } (b_1-b_2)\geqq T_b$$
$$B_1=0 \text{ if } T_b>(b_1-b_2)>-T_b$$
$$B_1=- \text{ if } (b_1-b_2)\leqq -T_b$$
$$B_2=+ \text{ if } (b_2-b_3)\geqq T_b$$
$$B_2=0 \text{ if } T_b>(b_2-b_3)>-T_b$$
$$B_2=- \text{ if } (b_2-b_3)\leqq -T_b$$
$$B_3=+ \text{ if } (b_3-b_4)\geqq T_b$$
$$B_3=0 \text{ if } T_b>(b_3-b_4)>-T_b$$
$$B_3=- \text{ if } (b_3-b_4)\leqq -T_b$$
$$B_4=+ \text{ if } (b_5-b_4)\geqq T_b$$
$$B_4=0 \text{ if } T_b>(b_5-b_4)>-T_b$$
$$B_4=- \text{ if } (b_5-b_4)\leqq -T_b$$

From observation of the character "h," it is apparent that the upper and lower profile functions have the following relative values:

$$A_1=- \quad B_1=-$$
$$A_2=0 \quad B_2=0$$
$$A_3=0 \quad B_3=+$$
$$A=_4- \quad B=_4-$$

As seen above, the upper and lower profile functions of a character may be computed and quantized into three levels, namely, positive, negative or zero. In another embodiment of the present invention, the functions may be quantized into two levels of a one (1) and zero (0) which is advantageous in employing such information in various binary digital computing and storing techniques. Therefore, in the following description the invention will be described with the profiling functions quantized so that the plus and minus relative levels will be regarded as a "1" while the previous zero level will remain a "0." For example, the character "h" functions now become:

$$A_1=1 \quad B_1=1$$
$$A_2=0 \quad B_2=0$$
$$A_3=0 \quad B_3=1$$
$$A_4=1 \quad B_4=1$$

representing neighboring scanning line portions which are equal in length with a "0" while neighboring scanning line portions of different lengths are represented by a "1." The line portions are so compared that only when the difference therebetween exceeds a minimal threshold difference of $T_a$ for the A functions or $T_b$ for the B functions is either profile functions A or B represented by a "1." Thus, small difference in lengths that may be due to curvatures, or rounded portions of characters such as are present in the character "e," for example, do not generate erroneous function signals.

A third group of functions, generally referred to as crossing functions, define the internal structure of each character. $C_1$ through $C_5$ functions represent intersections of the first through fifth scanning lines in the profile sweep mode, respectively. For example, in the character "T" (FIG. 2), $C_1$ through $C_5$ are all equal to 1; however, in the character "h," $C_1$ through $C_4$ are equal to 1 and $C_5$ equals 0 since the line 48, being the fifth in the sweep mode, does not intersect character detail at all. In the character profile of the letter "e," the C functions have the following values:

$$C_1=1;\ C_2=3;\ C_3=3;\ C_4=2 \text{ and } C_5=0$$

The C functions defined above are inherently invariant to the vertical position of a character within the profiling scanned frame of reference, since they define crossings which are independent of the scan start reference S and the scan end reference T. Similarly, the A (upper) and B (lower) profile functions are also invariant to the character position in the same direction, since the latter functions represent differences of absolute values ($a_1$, etc. and $b_1$, etc.) rather than actual absolute values, so that even though the absolute values may change due to variations in position of the character within the scanned frame of reference which may also be referred to as the scanning raster, yet since they change by equal amounts, the functions, being the difference thereof, will not change. The scanning raster is defined as the area bounded by the scan start reference line S, the scan end reference line T and the first and last scanning lines in the profile sweep mode (lines 44 and 48 for character "h").

Again referring to FIG. 1, the memory 25 shown therein may store at least thirteen functions, which include the functions $A_1$ through $A_4$, $B_1$ through $B_4$ and $C_1$ through $C_5$ for each known character in the alphanumeric system to be recognized. However, as will be explained hereinafter in greater detail, the memory 25 further stores a D function which provides additional information necessary to eliminate all ambiguity in the recognition of characters having a high degree of similarity. During the operation of the system of the present invention, an unknown character is scanned in the manner heretofore described and the fifteen functions generated. At the end of each profile sweep mode, indicating the end of the scanning of the character, the generated functions are supplied to the memory 25. The unknown character is recognized by finding a perfect match between the set of functions which were generated by scanning it, and a set of functions of one of the known stored reference characters, the latter mentioned matching technique being well known in the art as analogous to searching a computer memory to find a word stored therein which is identical to an input search word.

Figure 3:
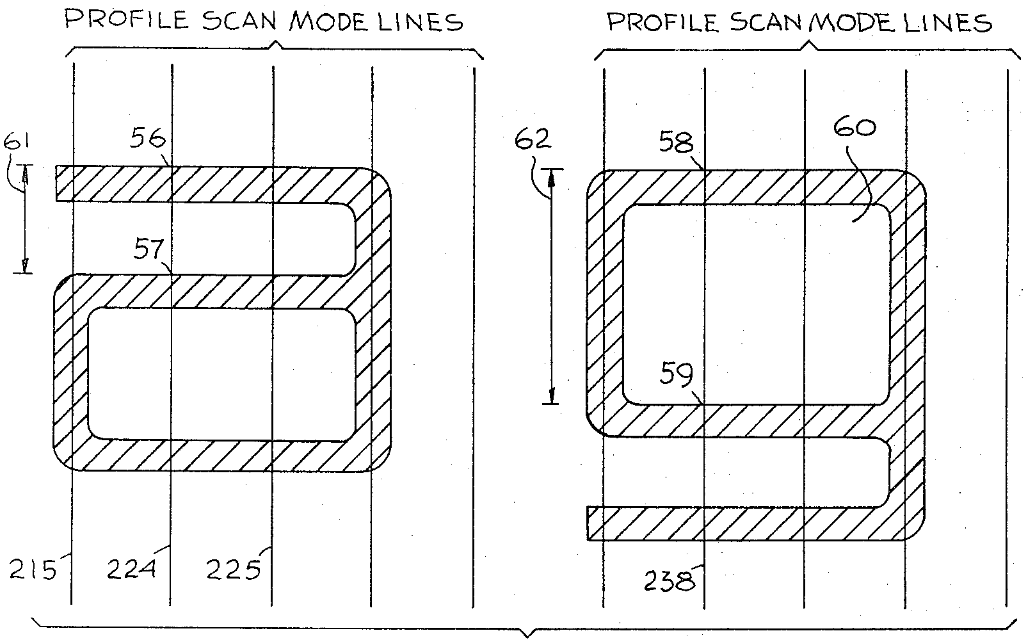

As stated previously, most characters may be identified on the basis of the unique profiles and crossings functions which they generate in the systems embodying the present invention. However, experience and careful analysis of the many fonts of printed or typed characters which may be identified by the method and apparatus of the present invention indicate that there are some fonts which generate substantially identical profiles and crossings functions. For example, the fonts of the characters a and g of the lower case Financial Gothic Alphabet which are shown in FIG. 3 generate identical upper and lower profile functions as well as identical crossings functions. It is clear, therefore, that unless additional distinguishing functions or signals which are unique to each of the characters are generated, ambiguity may result in attempting to automatically distinguish between them.

From FIG. 3, it is clear that since the upper and lower profiles of the two letters are substantially perpendicular to the sweep directions of the scanning lines, the upper and lower functions of the letters are all identical, all being equal to "0." Similarly, since the letters are symmetrical with respect to the center of the text line, the number of crossings of the scanning lines over the characters are the same, being equal to $C_1=2$; $C_2=3$; $C_3=3$; $C_4=1$; $C_5=0$. From observation, it is apparent that one distinguishing feature between the two letters is the distance between respective crossings of the characters with respect to a specific scanning line in the profile sweep mode. As seen in FIG. 3, the distance designated by numeral 61 between a crossing 56 of the straight portion of the letter "a" and a crossing 57 of the round portion of the same letter is shorter than a distance designated 62 between crossings 58 and 59 of the substantially round portion 60 of the letter "g." This difference in distances between respective crossings of the letters may be used to eliminate any ambiguity in automatically recognizing the letters according to the teachings of the invention, as explained hereinafter.

In one embodiment of the present invention employed in the recognition of characters including fonts of the lower case Financial Gothic Alphabet a function hereinafter referred to as the character spacing function is generated in addition to the profiles and crossings functions described above. The character spacing function may be generated by measuring the time elapsing between the first two crossings of the second scanning line over the character. If the time so measured exceeds a predetermined time interval, the character spacing function has a first value which may be regarded as a "1" which indicates that the letter scanned may be a "g." However, if the time difference between the first two crossings of the second line is less than a predetermined value, the character spacing function has a second value, regarded as a "0," which indicates that the letter scanned may be an "a" if, in addition, it also generates the profiles and crossings functions characteristic of an "a."

In the foregoing described embodiment of the present invention, the memory 25 (FIG. 1) stores the character spacing functions of all known characters to be recognized, in addition to the profiles of crossings functions thereof heretofore described, for a total of fourteen functions, made up of four A functions, four B functions, five C functions and one D function. For convenience only, all the fourteen stored functions characteristic of any known character will hereinafter be referred to as the "stored code" of the known character. At the end of the scanning of a complete character, the generated functions which hereinafter will be generally referred to as the "generated code" and which include four A upper profile functions, four B lower profile functions, five C crossings functions and one character spacing function D, for a total of fourteen functions are supplied to the memory wherein the "generated code" of the unknown character and the previously stored "stored codes" of known characters are compared, to produce an output signal which is characteristic only of the specific unknown scanned character. The A, B, and D functions are binary functions, i.e. each is either a binary "1" or a binary "0," so that each can be stored in the memory 25 in one bit. The five C functions are decimal numbers, each being storable in a plurality of bits. As will be described hereafter, each of the C functions may be supplied at the output of a binary counter in the form of a plurality of bits. Thus each "stored code" may be stored as a multibit code or word. The "stored code" may be thought of as consisting of a set of digital character signals.

It is apparent to one familiar in the art that various circuitry arrangements may be employed to scan characters in two different modes and to generate the functions described which are necessary for character recognition. Therefore, the following description of specific circuits is presented for explanatory purposes only, it being clear that it is within the contemplation of this invention to include all circuit arrangements which scan characters in two different modes and generate character functions of upper profiles, lower profiles, crossings and spacings as heretofore described.

Figure 4:
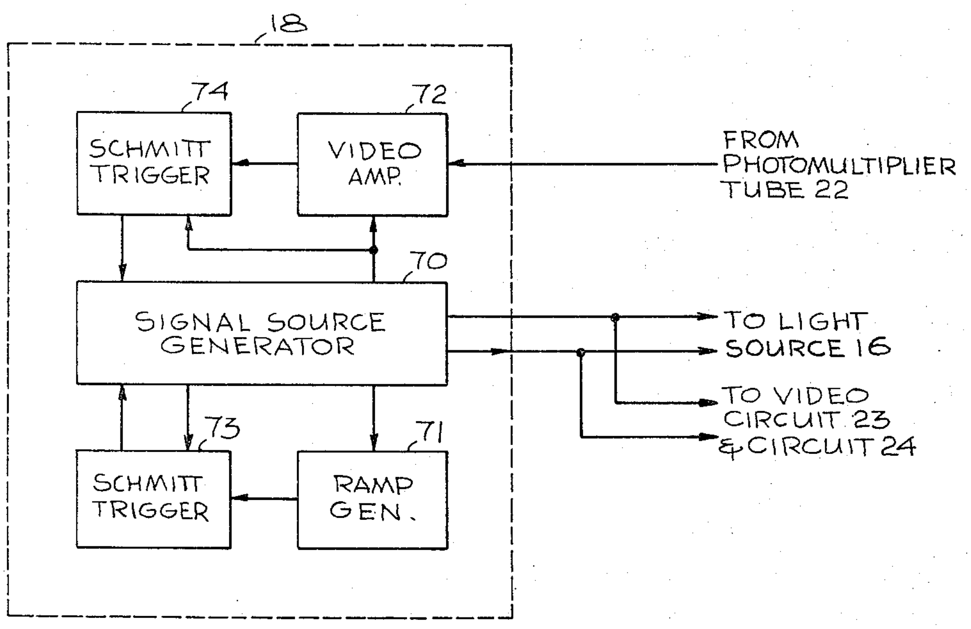
FIGURE 4 is a partial block diagram of circuitry incorporated in the invention.

As previously stated, the system of the invention disclosed herein is adapted to scan the text surface 17 (FIG. 1) in a search scan mode until character detail producing video signals above a predetermined level are obtained, at which time the scanning of the text surface switches to a profile scan mode comprising a number of lines not to exceed five, which are sufficient to scan any unknown character. These two different scanning modes are generated and controlled by the scanning control circuitry 18 (FIG. 1), which is shown in greater detail in FIG. 4. As shown therein, the scanning control circuitry 18 comprises a signal source generator 70 connected to a ramp generator 71 and to a video amplifier 72 which is also connected to the output of the photomultiplier tube 22, and two conventional Schmitt triggers 73 and 74 connected to the generator 70. The signal source generator 70 includes a pulse clock (not shown) which produces a series of pulses of a fixed amplitude, and a scan mode control similar to conventional gating circuitry whose output level controls the time period between the pulses produced by the pulse clock. The output signals from the signal source generator 70 consist of sweep signals necessary to drive the light source 16, video signals at preselected levels and signals for the scan mode control so that the light source 16 may scan the text surface 17 (FIG. 1) in the two different scan modes as described above. The functional interrelationship of the circuits comprising the scanning control circuitry 18 may best be explained in connection with FIG. 5, which is a diagrammatic representation of various interrelated waveforms produced in the circuits shown in FIG. 4.

Assume that the signal source 70 supplies a scan signal 75*a* to the light source 16, causing it to scan the surface 17 with a line in the search scan mode, such as the line 33 shown in FIG. 2. Although in practice, the light source or flying spot scanner 16 comprises more than a single tube as shown in FIG. 1, it is apparent to one familiar in the art that with known devices and scanning techniques, a light source may be made to scan a surface in response to a signal similar to the pulse 75*a* (FIG. 5) so that description of the actual scanning circuitry is deemed unnecessary. The scanning line 33 produced in response to the signal 75*a* will scan the text surface 17 in a direction perpendicular to the line of text, and assuming that any character detail, such as the leading edge of the letter T (FIG. 2) has been scanned, the video output signal of the photomultiplier tube 22, represented by a line 76 in FIG. 5, would be supplied to the video amplifier 72 whose output signal is represented by a line 77. The video amplifier 72 amplifies and integrates the video signals produced during the scanning of each line and when such integrated amplified signals exceed a threshold level 79 (FIG. 5), the output of the video amplifier causes a conventional Schmitt trigger to change its output level from a preset level. For example, assuming that a video signal 78 is supplied from the photomultiplier tube 22 to the amplifier 72, wherein the video signal is integrated and amplified so that the output signal indicated by line 77 of the amplifier 72 may equal a threshold level 79, as indicated by the point of intersection 80, causing the Schmitt trigger 74 to change levels, producing a negative-going pulse 81. For simplicity in the following description, positive levels of the various circuits will be referred to as "false" while negative levels will be referred to as "true." It can therefore be stated that when the output of the video amplifier 72 exceeds a predetermined threshold level, it causes the Schmitt trigger 74 to become true as shown by line 82. The Schmitt trigger 74 will remain true during the rest of the period of the scanning line produced by the signal 75 until retrace of the signal 75*a* is initiated by the signal source 70. The retrace of the signal 75*a* is initiated by the leading edge of pulse 83. The circuits are so interconnected that since the Schmitt trigger 74 is true when the pulse 83 is generated, the signal source 70 will cause the light source 16 to scan the text surface 17 in the profile scan mode previously described. The change in sweep modes from the search scan mode to the profile scan mode also causes the output signal 84 of the ramp generator 71 to increase at a predetermined rate, as indicated by the sloping line 85. Similarly, the change to the profile scan mode results in the sweep mode control level changing from false to true, as shown by line 86. The trailing edge of the pulse 83 resets a video integrator (not shown) in the video circuitry 72 and resets the Schmitt trigger 74 to false, as indicated by lines 90 and 91, respectively, and initiates the scanning of the surface in the profile scan mode.

The signal 83*a* is the first to cause the text surface to be scanned in the profile scan mode with scanning line 34 (FIG. 2), resulting in video signals 92 which when integrated cause the video amplifier 72 to have an output signal which exceeds the threshold line 79 at a point 93. As the output signal of the video amplifier 72 exceeds the threshold level the Schmitt trigger 74 becomes true again and continues in this state until a next pulse 95 is generated in the signal source 70. Since the Schmitt trigger 74 is true during the leading edge of the pulse 95, the system remains in the profile scan mode, with the trailing edge of the pulse 95 initiating the second line in this mode and resetting the video amplifier 72 and the Schmitt trigger 74 to false. The scanning will continue in this mode as long as the output of the video amplifier 72 will exceed the threshold level 79 during any complete period of a single scanning line. However, during the fifth period in the profile scan mode, the output signal of the ramp generator 71 will have exceeded a threshold level 96, as indicated by the point of intersection 97, causing the Schmitt trigger 73 to become true as shown by line 99, so that when the next succeeding pulse 100 is generated, the system will revert to the search scan mode.

The leading edge of the pulse 100, appearing when Schmitt trigger 73 is true, causes the output signal of the ramp generator 71 to return to its search scan mode level, and will switch the level of the scan mode control of the signal source generator 70 to false, as indicated by line 101. The trailing edge of the pulse 100 will initiate the scanning in the search sweep mode. The trailing edge of the pulse 100 will also reset the video amplifier 72 and the Schmitt trigger 74 to false, as indicated by lines 104 and 105, respectively. The text surface 17 (FIG. 1) will now be scanned in this mode until sufficient video signals 106 from the photomultiplier 22 will cause the output signal of the video amplifier 72 to exceed the threshold level 79, as indicated by point of intersection 108, which will again cause the Schmitt trigger 74 to become true thereby reverting the system back to a profile scan mode.

As described, as long as the video signals integrated during the scanning period of a single scanning line exceed the threshold level 79, the system will remain in the profile sweep mode, at least during the scanning of the text surface 17 by five lines. However, let us assume that during the scanning of the text surface with a line initiated by a pulse 110 which is only the second line in a profile scan mode, no video signals are generated due to the absence of character detail. It is apparent that the output signal of the video amplifier 72 will not exceed the threshold level 79, as indicated by the horizontal line 111, so that the Schmitt trigger 74 remains false, as shown by horizontal line 112 when the next succeeding pulse 113 is generated. Since the Schmitt trigger 74 is false, the system reverts back to the search scan mode. The leading edge of the pulse 113 switches the sweep mode control level to false, as indicated by line 115, and discharges the ramp generator 71 to its search scan mode level, as indicated by line 116.

From the foregoing, it is apparent that the invention herein disclosed is adapted to scan a text surface in a search scan mode, and when video signals exceeding a predetermined level are produced, the system changes to a profile scan mode which continues so long as the video signals produced during each scanning line exceed the predetermined level, or until the text surface has been scanned by five lines in this mode. Such an arrangement enables the accurate scanning of wide unknown characters as well as narrow ones, five scanning lines being sufficient to scan the widest characters.

As previously stated, the system may be adapted to operate in the profile scan mode by scanning each character with more or less than the five lines described above. Further, the system may be operated in a single scan mode, it being clear that all such different scanning arrangements are within the contemplation of the present invention.

As previously explained, the video signals generated during the scanning of an unknown character in the profile scan mode are used to derive the various upper and lower profile functions, crossing functions and character spacing functions, which are then compared with known functions of known characters in order to identify the unknown character.

Figure 6:
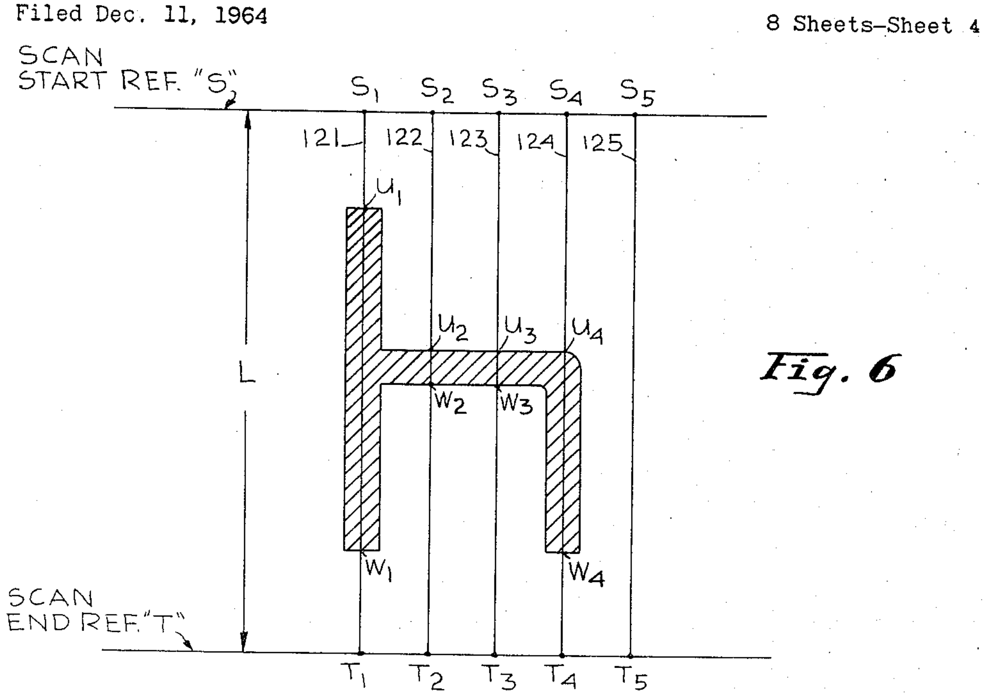
FIGURE 6 is another diagram useful in explaining threshold techniques incorporated in the invention.

Before explaining in detail the circuitry employed in deriving the various functions, reference is made to FIG. 6 wherein the letter "h" of the lower case Financial Gothic Alphabet is shown as it is scanned in the profile scan mode by five lines, designated by numerals 121, 122, 123, 124 and 125, the lines being of equal length L. The scanning lines start at the scan start reference line S at points $S_1$, $S_2$, $S_3$, $S_4$ and $S_5$ and terminate at the scan end reference line T at points $T_1$, $T_2$, $T_3$, $T_4$ and $T_5$ respectively, crossing character details $U_1W_1$, $U_2W_2$, $U_3W_3$ and $U_4W_4$ respectively. As previously explained, each of the upper profile functions represents relative differences between the starting of two adjacent scanning lines and the first crossings of character detail, as, for example, $$A_1=1 \text{ if } (S_2U_2-S_1U_1)\geqq T_a$$

and $A_1=0$ if $(S_2U_2-S_1U_1)<T_a$. However, since the scanning lines scan each character or letter sequentially rather than simultaneously, means have to be provided to delay the video signals generated during any line scan so that signals such as may be produced by character detail $S_1U_1$ during line 121 may be coincidentally compared with signals produced during the subsequent line, such as may be produced by character detail $S_2U_2$. The necessary delay period equals the time necessary for a complete scanning line plus re-trace time so that signals from two adjacent scanning lines may simultaneously be available for the generating of the various functions.

FIG. 7 is a simplified block diagram of the circuits used to derive the various functions from the video signals produced by the photomultiplier tube 22 which is connected to the video circuitry 23 comprising a video amplifier 127 connected to a gate 129. The gate 129 is also connected to the signal source generator 70, so that when the scan mode control in the signal source generator 70 is true (see FIG. 5), indicating that a character is being scanned in the profile scan mode, the gate 129 is opened so that signals from the video amplifier 127 may pass therethrough. The video amplifier 127 is adjusted to produce an output signal only when the video signals supplied thereto exceed a predetermined level so that spurious video signals that may have been produced by optical transmissivity irregularities of the text surface will not result in misleading video character information. The output line of the gate 129 is connected to an output terminal 128 and to a delay circuit 131 whose output line is connected to an output terminal 130.

The delay circuit 131 is adjusted to delay the output signals from the video amplifier 127 by a time period substantially equal to the time of one complete scanning period, so that video signals produced during the scanning of a given line appear at the output terminal 128 while video signals produced during the scanning of a preceding line coincidentally occur at the output terminal 130. The time delayed and undelayed video signals at the output terminals 130 and 128, respectively, are supplied to a signal routing control circuit 132 in the character profile determination and storage circuitry 24, which further comprises an upper profile functions generator 133, a lower profile functions generator 134, an internal structure or crossing functions generator 135, consisting of five subgenerators **135*a*–135*e*, a character spacing function generator 136, a register unit 132*a* and a gate 137. The video signals appearing at the output terminals 128 and 130 are supplied to the various functions generators through the signal routing control 132 which is in turn controlled by signals from the signal source generator 70 as will be explained hereinafter. The signal routing control 132 also routes the various A functions, B functions and a D function generated in generators 133, 134 and 136 respectively, to appropriate locations in register unit 132*a* for storing, so that all the functions may be present coincidently in time to be supplied through gate 137 to memory 25** as the generated code, at the end of the scanning of a complete character.

According to the teachings of the present invention, four upper profile functions $A_1$–$A_4$ are derived from video signals generated during the scanning of an unknown character, such functions being later employed to recognize the character.

The upper profile function generator 133 (A functions) is shown in greater schematic detail in FIG. 8. As seen therein, the generator 133 has two input leads shown respectively connected to video terminal 128 and to delayed video terminal 130, although in practice the generator 133 is connected to the terminals through the control 132 as shown in FIG. 7. Let us assume that the video signals at terminals 128 and 130 are supplied to 133 during the scanning of an unknown character by the second scanning line in the profile scan mode. It is apparent then that the signals at terminal 128 designated $v$ will be those produced during the scanning of the second line since those signals are not delayed by any delay circuitry interposed between the photomultiplier tube 22 and the terminal 128. However, the signals at the terminal 130 designated $v_d$ are those produced during the scanning of the first line in the profile scan mode, the signals having been delayed by the delay circuit 131 as previously described. The signals $v$ at the terminal 128 are supplied to a multivibrator 143 and to one input terminal of an OR gate 144. The signals $v_d$ at the terminal 130 are supplied to another terminal of the OR gate 144 and to a multivibrator 145. The OR gate 144 is operable to be energized by a pulse on either of its input lines, so that a signal at either terminal 128 or 130 causes the OR gate to produce an output signal which is delayed and inverted by a delay and inverter circuit 147. The leading edge of the inverted output signal of the circuit 147 will set a flip-flop 148, which will produce an output signal supplied in turn to an AND gate 149. At the same time the multivibrators 143 and 145, which are conventional monostable multivibrators, produce output signals of a predetermined time duration in response to the leading edges of the signals supplied thereto from terminals 128 and 130, respectively. The output signals of the multivibrators are supplied to the AND gate 149 which operates to produce an output signal only if the output signals from both multivibrators are supplied thereto before the flip-flop 148 is set by the circuit 147. Such an output signal from the AND gate 149 sets a flip-flop 150, producing an output signal $A_1$, which is supplied to the signal routing control 132 (FIG. 7). The level of the output signal of the flip-flop 150 represents whether the upper profile function $A_1$ is a "0" or a "1," as previously defined.

For a better understanding of the operation of the upper profile function generator 133, reference is now made to FIG. 9*a* wherein various interrelated waveforms basic to the operation of the generator 133 are diagrammatically represented. The waveforms shown on lines 1 and 2 represent the video signals produced during the scanning of a character "h," such as is shown in FIG. 6, with the first two scanning lines 122 and 121, respectively. The video signals produced by line 122 when crossing character detail $U_2W_2$ (FIG. 6) are represented by a pulse 151, while the video signals produced by the preceding line 121 when crossing character detail $U_1W_1$ are represented by a pulse 152, the leading edges of the pulses 151 and 152 corresponding to the instant the scanning lines 122 and 121 crossed the upper profile of the character h at points $U_2$ and $U_1$, respectively. As soon as the leading edge of the pulse 152 appears at the terminal 130 (FIG. 8) at time $t_1$, the OR gate 144 is energized, producing an output signal 153 which makes the gate 144 true, as seen on line 5, FIG. 9*a*. The leading edge of the pulse 152 also sets the multivibrator 145 to true, causing it to produce a true output signal 154 of a time duration $t_m$. This output signal is supplied to the AND gate 149, (FIG. 8). At time $t_1$, the true output signal of OR gate 144 is supplied to the delay and inverter circiut 147 which produces a false output signal 155 at time $t_2$, delayed with respect to its input signal by a time duration $t_d$, wherein $t_d=t_2-t_1$, $t_d$ being shorter than $t_m$. The output signal 155 of the delay and inverter circuit 147 sets the flip-flop 148 at time $t_2$ so that it has a false output signal 156, which is supplied to the AND gate 149. However, as previously explained the AND gate 149 will have a true output signal only if signals from both multivibrators 143 and 145 go true before the flip-flop 148 becomes false. It is, therefore, apparent that in the present example, the AND gate 149 will not produce a true output signal since, as seen in FIG. 9*a*, the flip-flop 148 becomes false at time $t_2$, which is earlier than time $t_3$ when the multivibrator 143 produces a true output signal. The absence of a true output signal of AND gate 149 causes the flip-flop 150 to remain false. Such a voltage level is considered as a "1," thus indicating that an upper profile is present, namely, that the neighboring scanning line portions $S_1U_1$ and $S_2U_2$ (FIG. 6) differ in length by more than a predetermined difference which is controlled by the time delay $t_d$.

To complete the description of the system which generates the upper profile functions, consider the case wherein the video pulses produced by two neighboring scanning lines are close in time, such as will be produced by lines 123 and 122 (FIG. 6) crossing the character "h" at points $U_3$ and $U_2$ respectively. The pulses so produced are indicated in FIG. 9*b* by numerals 161 and 162 occurring at times $t_5$ and $t_4$, respectively. The difference in time of the occurrence is a result of the surface irregularities of the character "h." As previously explained, such pulses will energize their respective multivibrators 143 and 145 (FIG. 8) whose output signals which energize the AND gate 149 are respectively represented by the pulses 163 and 164. The first in time of pulses 161 or 162 also energizes (at time $t_4$) the OR gate 144 so as to produce an output pulse 165, which in turn causes the delay and inverter circuit 147 to produce an output signal 166 at a time interval of $t_d$ after the time $t_4$, indicated at $t_6$. From FIG. 9*b*, it is apparent that between the times $t_5$ and $t_6$ all three inputs from multivibrators 143 and 145 and flip-flop 148 to the AND gate 149 are true, so that the gate 149 produces a true output signal 167 which in turn sets flip-flop 150 to produce a true signal 169. The true output signal 169 indicates that the upper crossings of two adjacent lines do not differ by more than the time delay $t_d$, representing the upper profile threshold level thus indicating that the upper profile function $A_1$ is a "0." The $A_1$ function is then routed by logic routing control 132 to the register unit **132*a* for temporary storage until all the functions are generated. The upper profile functions $A_2$, $A_3$ and $A_4$ are generated in a similar manner and routed for storage in unit 132*a***.

As described, the video signals generated while scanning a character to be recognized are also used to derive lower profile functions designated above as $B_1$, $B_2$, $B_3$, and $B_4$. Each lower profile function relates the points of last intersections of two adjacent scanning lines with character detail to the ends thereof. For example (see FIG. 6)

$$B_1=0 \text{ if } (L_2T_2-L_1T_1)\leqq T_b$$

while $B_1=1$ if $(L_2T_2-L_1T_1)>T_b$. Similar relationships exist for $B_2$, $B_3$ and $B_4$. The derivation of the lower profile B functions is accomplished by means of gating and pulse delaying techniques which are similar to those used in deriving the upper profile A functions described above.

In one embodiment of the present invention, the lower profile B functions $B_1$ through $B_4$ are generated in a lower profile function generator 134. The lower profile function generator 134 is described in detail in connection with FIGS. 10*a* and 10*b*.

As seen in FIG. 10*a*, the generator 134 has its input leads connected to the terminals 128 and 130 as did the upper profile generator. In practice, generator 134, like generator 133, is connected to terminals 128 and 130 through the logic routing control 132. The undelayed and time delayed video signals $v$ and $v_d$, respectively, are shown in lines 1 and 2 of FIG. 10*b* as pulses 173 and 174 starting at times $t_2$ and $t_1$, respectively. The undelayed pulse 173 impressed at the terminal 128 at time $t_2$ is supplied to an inverter 175 (FIG. 10*a*) which produces an output pulse 176 having a polarity opposite to that of the pulse 173. The pulse 176 is simultaneously supplied to a flip-flop 177 and to a three input terminal NAND gate 178. The NAND gate 178 is also energized by the time delayed pulse 174 from the terminal 130 and by an output signal of a multivibrator 179. The multivibrator 179 is energized by the trailing edges of the pulses 173 and 174 at times $t_3$ and $t_5$, respectively, so as to produce false pulses 181 and 182 as shown in line 4 of FIG. 10*b*. The pulses 181 and 182 have a predetermined time duration $t_x$, which is a function of the monostable multivibrator circuit 179, as is well known in the art. The NAND gate 178 is operable to produce a false output level, as indicated by line 184 in FIG. 10*b* only when the levels of the pulses at its three input terminals are all true as shown in lines 2, 3 and 4 of FIG. 10*b* during the time period between $t_1$ and $t_2$. The false level of NAND gate 178 (line 184) after time $t_1$ resets the flip-flop 177 so that its output level is false as shown by line 185. This state will persist until the time $t_2$ when the pulse 176 from the inverter 175 changes the level of one of the input terminals of NAND gate 178 to false, thereby causing the NAND gate to set flip-flop 177 to true as indicated by line 186. The trailing edge of the pulse 173 at time $t_3$ will energize the multivibrator 179 to produce the pulse 181, which at times $t_4(t_4=t_3+t_x)$ causes the output level of the multivibrator 179 to become true, so that during the time period between $t_5$ and $t_4$ the three input terminals to the NAND gate 178 are again all true as shown by numerals 191, 192 and 193. This causes the output of the NAND gate 178 to again become false as indicated by line 194 and to reset the flip-flop 177 so that its output level becomes false as indicated by numeral 195. Such a false level when supplied to the NAND gate 196 (FIG. 10*a*) produces an output level which indicates a lower profile $B_1$ function which equals a "1", namely, that the trailing edges of the pulses 173 and 174 are spaced in time by more than the time $t_x$, which is the time duration of the pulse 181 produced by the multivibrator 179.

It is apparent from the foregoing that had the trailing edge of the pulse 174 occurred sometime between $t_3$ and $t_4$ rather than at $t_5$, one of the inputs to the NAND gate 178 would have been false so that the NAND gate 178 would not have reset the flip-flop 177 to false, maintaining a true output level which when supplied to the NAND gate 196 indicates a lower profile $B_1$ function equal to a "0" as heretofore defined.

In the foregoing description regarding deriving the lower profile function $B_1$, the inverted undelayed video signal $v$ was compared with the time delayed video signal $v_d$. However, in order to accomplish complete symmetry, it is necessary to compare the inverted time delayed $v_d$ video signal with the undelayed, uninverted $v$ signal. Such is accomplished by inverter 201, NAND gate 202 and flip-flop 203 shown in FIG. 10*a*, the circuits operating in a manner identical to the one already described, so that the output level of either the flip-flop 177 or flip-flop 203 is indicative of the lower profile function. The lower profile function $B_2$, $B_3$ and $B_4$ are similarly derived and routed to appropriate register units **132*a* by signal routing control 132**.

In addition to the upper and lower profile functions described above, the video signals generated by scanning a character to be recognized are also used to derive character crossing functions which define the number of times each scanning line in the profile scan mode crosses character detail. For example, the character crossings functions of the character "a" shown in FIG. 3 are as follows:

$$C_1=2,\ C_2=3,\ C_3=3,\ C_4=1 \text{ and } C_5=0$$

Each of these C functions are derived in one of the subgenerators **135*a*–135*e* of the generator 135** (FIG. 7).

In one embodiment of the present invention, each of the subgenerators **135*a*–135*e*** comprises a binary counter as shown in FIG. 11*a*. Each binary counter is energized by signals from the signal routing control 132 and supplies the final count therein to the gate 137. As a character is scanned in the profile scan mode, the video signals generated thereby are supplied to one of the subgenerators which counts the number of times character detail intersects the scanning line. For example, let us assume that the character "a" (FIG. 3) is scanned by the line 215, being the first line in the profile scan mode. It is apparent the line is twice intercepted by character detail, so that two video pulses, 216 and 217, as shown in FIG. 11*b*, are generated which are in turn supplied to the subgenerator 135*a* which counts the two pulses by detecting their leading edges 218 and 219. Similarly, the subgenerator 135*b* counts the pulses 221, 222 and 223 generated by the second scanning line 224 which scans the character "a" (FIG. 3). From observation of FIG. 3, it is apparent that the line 225 will generate three pulses to be counted by the subgenerator 135*c*, such as the pulses 227, 228 and 229 of FIG. 11*b*. The scanning line 230 will generate only a single pulse 230, while the fifth and last scanning line 232 will not generate any pulses as indicated by line 231, since it is not intercepted by any character detail, resulting in a count of zero in the subgenerator 135*c*.

As previously explained, the upper profile A functions, the lower profile B functions and the character crossings C functions provide sufficient unique information to recognize most unknown characters. However, some characters such as the "a" and "g" (FIG. 3) of the lower case Financial Gothic Alphabet require additional character information to avoid any ambiguity in distinguishing between them. As stated above, the crossings spacings, such as indicated by the arrows 61 and 62 in FIG. 3, may be used for that purpose. Namely, during the scanning of an unknown character with the second line in the profile scan mode, the time between the first crossing, such as indicated by numeral 56 and the second crossing 57, is compared with a predetermined time period so that if the two crossings 56 and 57 occur during that period, the additional information will indicate that the character may be an "a" while if the two crossings, such as 58 and 59, do not occur during that period, the character may be a "g" (if, in addition the A, B, and C functions characteristic of a "g" are also generated).

For a more complete description of the character crossings spacings function and the circuitry used to generate it, reference is made to FIG. 12*a*, wherein the character crossings spacings function generator 136 is shown in greater detail. As seen therein, the generator 136 comprises a binary counter 235. It receives video signals from the video circuit 23 (FIG. 1) through control 132 (FIG. 7) during the scanning of any character in the profile scan mode. The output of the counter 235 is connected to a decoding network 235*a* which decodes the "one" state of the counter 235. The output of the decoding network is in turn connected to one input of an AND gate 236 and to a delay line 237 whose output is connected to the other input of the AND gate 236. Let us assume that the binary counter 235 is energized by a signal due to the line 238 (FIG. 3) being intersected by the character g at the crossing 58. The output of the counter 235 will be in the "one" state at time $t_1$ as shown in FIG. 12*b*. The binary counter 235 is decoded for a "one" state by the network 235*a* which supplies, at time $t_1$, a true signal to AND gate 236 and to the delay line 237, which will produce a true output signal to the AND gate 236 at time $t_2$, the time delay produced herein being equal to $t_2-t_1$. Since the two input signals to the AND gate 236 are true, an output signal will be produced, indicating that the first crossing (58) was spaced from any second crossing such as crossing 59 (FIG. 3) (which causes the output of the decoding network 235*a* driven by the binary counter to become false again, as indicated by 59' in FIG. 12*b*), by a time period greater than the time delay introduced by the delay line 237. However, if at time $t_1$ the output of the binary counter 235 became true due to the crossing 57 of the character "a" (FIG. 3), the subsequent crossing 56 would cause the binary counter 235 to count a "two" state causing network 235*a* output to become false at a time $t_x$, as designated by 56' in FIG. 12*b*. Therefore, when the output of the delay line 237 becomes true at time $t_2$, the input signals to the AND gate 236 will not be of the same polarity, namely, the signal from the delay line 237 will be true, but the signal from the decoding network 235*a* will be false, so that no output signal of the AND gate 236 will be produced. Such lack of signal is therefore an indication that adjacent crossings (56 and 57) are closer in time than the predetermined delay time of the delay line 237, thereby indicating that the character scanned may be an "a" if it also generates A, B and C functions characteristic thereto.

From the foregoing description, it is apparent that a system is disclosed herein whereby a character is sequentially scanned by a series of lines producing video signals which are used to generate character functions used for identifying the character. As previously stated, the video signals from the video circuit 23 (FIG. 7) are supplied to the various function generators. Although different signal routing techniques may be employed, the following description is but one example of a portion of the control 132. As shown in FIG. 13, the signal routing control 132 may comprise a gate 241 and a switch 242 which are controlled by signals and pulses from the signal source generator 70. The gate 241 has two input leads connected to the terminals 128 and 130 (FIGS. 13 and 7) which supply undelayed and time delayed video signals as explained above. However, the signals cannot pass through the gate 241 until it is opened by a true level of the scan mode control as indicated by numeral 86 in FIG. 5. Such a true level indicates the beginning of the profile scan mode, opening the gate 241, thereby enabling the signals from the terminals 128 and 130 to pass to the switch 242. The switch 242 is in turn controlled by the pulses from the signal source generator 70, which are generally designated in FIG. 13 by numerals 245–249. For example, the pulse 245 being the first pulse in the profile scan mode series of five pulses causes the switch to supply the undelayed video signal from the terminal 128 to the subgenerator 135*a* so that the character crossings $C_1$ function may be generated therein. Similarly, the pulse 246 causes the switch to supply the undelayed video signal from the terminal 128 and the time delayed video signal from the terminal 130 to the inputs of generators 133 and 134 so that the upper profile $A_1$ function and the lower profile $B_1$ function may respectively be generated therein. The switch also supplies the undelayed video signal from the terminal 128 to the subgenerator 135*b* and the generator 136 so that the character crossings $C_2$ function and the character crossings spacing D function may be respectively generated therein.

The rest of the pulses, namely 247–249, cause the switch 242 to similarly route the signals from the terminals 128 and 130 to the various function generators so that the rest of the A, B and C functions are generated in them. The control 132 may include additional circuitry so that as each A, B and D function is generated, it is routed and temporarily stored in an appropriate location in register unit 132*a*.

Figure 5:
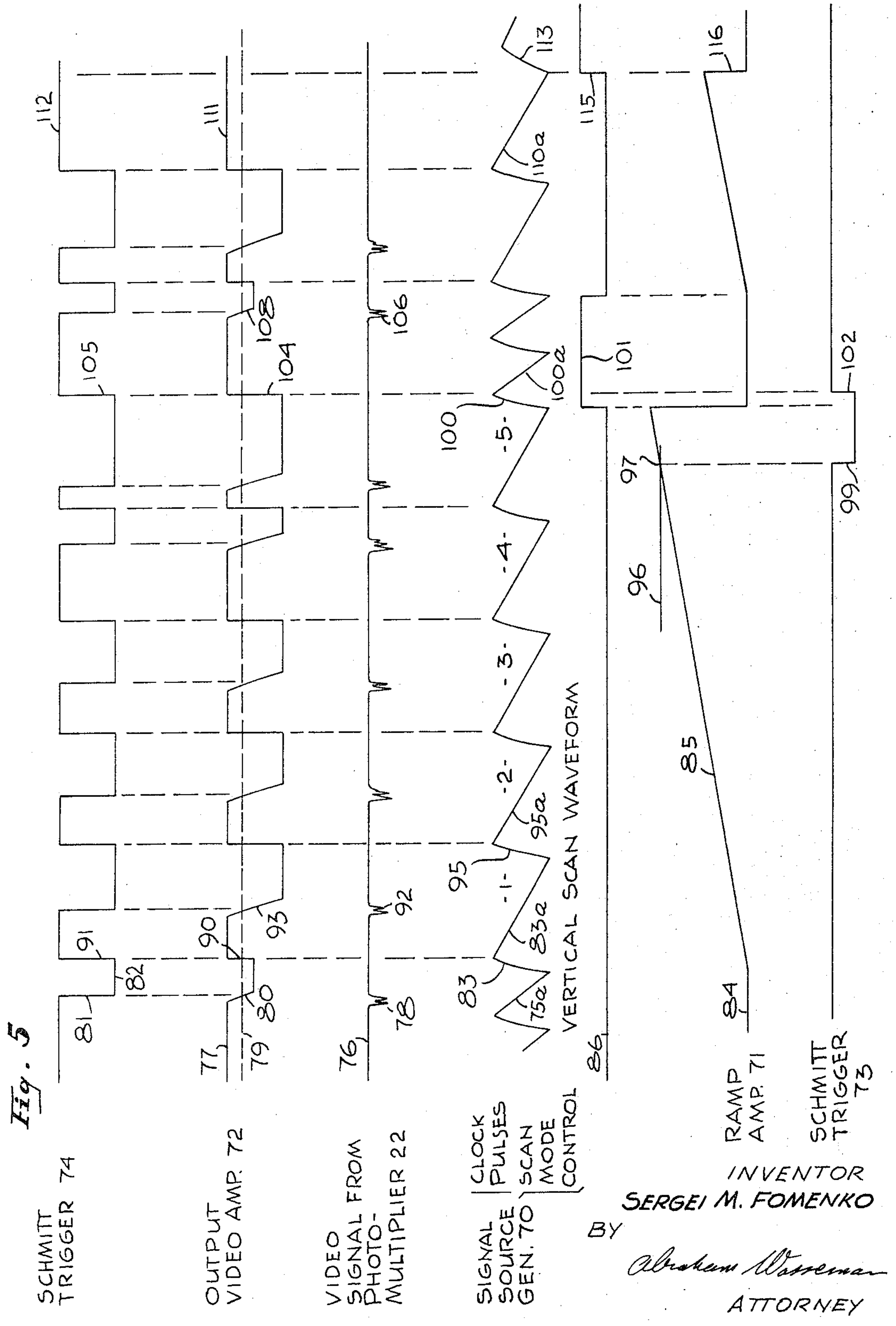
FIGURE 5 represents a plurality of waveforms useful in explaining the invention.

At the end of the profile scan mode which may comprise five lines or less as heretofore explained, all the character functions have been generated and stored, the four A functions, the four B functions and the D function in unit 132*a* and the five C functions in 135. At such time the scan mode control of the signal source generator 70 becomes false as seen in FIG. 5. The false level of the scan mode control closes the gate 241 (FIG. 13) and opens the gate 137 (FIG. 7) so that all the character functions, which have been sequentially generated in the function generators 133–136, but which are present in unit 132*a* and generator 135 are simultaneously supplied to the memory 25 (FIG. 7). The memory 25 may comprise a plurality of gating circuits, such as AND gates, each having its input terminals connected to a predetermined combination of the outputs of the generators 133–136, the combination representing a known character so that if the unknown character which is scanned generates a combination of functions whose output levels energize a particular gate, the output thereof indicates the character which is being scanned, thereby recognizing it. Such a technique of recognizing an unknown character is analogous to supply unknown data to a computer wherein known data has been previously stored, so that if the supply data matches stored data in the computer output signals are produced which are characteristic of the unknown data, such computer searching techniques being well known in the art. Similarly, the "stored code" of each known character may be prestored in a multibit memory word and the "generated code" transferred through gate 137 to an input register of memory 25. With known associative memory techniques, the content of the input register may be compared with each memory word to provide a signal indicating the scanned character. Thus, memory 25 should be assumed to include the storing means for storing the "stored codes" as well as the input register and the other circuitry necessary for the comparison operation. Such circuits are well known in the computer art and therefore are not described herein in detail.

Briefly summarizing, the foregoing description discloses a novel method and system for recognizing an unknown character on the basis of character functions generated from video signals which are produced by scanning the unknown character in a predetermined series of scanning lines. As disclosed herein, a light spot, such as a flying spot scanner, scans a text surface in a first search scan mode which comprises scanning lines which are longer than the highest character to be recognized. Upon detecting the leading edge of a character, which is indicated by the generation of video signals above a selected threshold, the system switches into a profile scan mode wherein the character whose leading edge was detected is sequentially scanned by not more than five lines. Each scanning line may be intercepted by character detail producing video signals whose time relationship and duration are used in circuitry such as described to generate character functions which when compared to character functions of known characters produce signals indicative of the character scanned.

As stated above, the system may also operate in a single scan mode rather than the search and profile scan modes described herein. Further, each character may be scanned by any desired number of lines rather than a maximum of five lines. In addition, many changes and modifications may be made by one skilled in the art in the various circuits shown herein and in the principle underlying the teachings of the present invention without departing from the true spirit and scope of the invention.

Accordingly, the invention should be considered to encompass any and all alternative arrangement modification variations and equivalent methods and structures falling within the scope of the annexed claims.

What is claimed is:

1. A character recognition apparatus for recognizing a character displayed in a line of text, comprising:

means for scanning with scanning lines at least one line of text wherein at least a single character is displayed and for producing a first set of digital character signals which are a function of the geometric configuration of said single character and the scanning lines, the number of scanning lines used to scan said single character being a function of its width but not exceeding a predetermined number, said first set of digital character signals including signals which represent the number of intersections of individual scanning lines by character detail and said first set of digital character signals including, in addition, at least one signal which is a function of the spacing between successive points of intersection of character details with a selected one of the lines scanning said character; and storing means prestoring sets of digital character signals characteristic of the geometric configuration of a known character with respect to said scanning lines, said storing means including means responsive to said first set of digital character signals for comparing said first set of digital character signals with said prestored sets of digital signals and for producing an output signal whenever said first set of digital character signals is substantially comparable to a second set of digital character signals within said prestored sets of digital signals, said second set of digital character signals being characteristic of a known character which is substantially similar to said single character.

2. A character recognition apparatus for recognizing characters on a line of text, comprising:

scanning means for scanning a line of text, defining characters to be recognized, with scanning lines whose direction is substantially perpendicular to the direction of said line of text, the length of each scanning line being greater than the maximum height of any one of said characters;

scan control means coupled to said scanning means for controlling said scanning means so that said line of text is scanned in a first mode in the absence of a detected one of said characters, and is scanned in a second mode upon the detection of a first one of said characters, the number of scanning lines used to scan each character in said second mode being a function of the width of the scanned character but not exceeding a predetermined number; said scan control means being further operable to switch to said first mode of scanning after said first one of said characters is scanned until the detection of the next character of said characters to be recognized, the spacing between scanning lines in said first mode being less than the width of a character line and the spacing between scanning lines in said second mode being greater than the width of a character line;

means responsive to the scanning lines scanning said first one of said characters for producing a first set of digital character signals which are a function of the configuration of said first one of said characters and the characteristics of the scanning lines scanning said chracter, said first set of signals including some signals which are a function of the relative first and last points of intersections of consecutively generated scanning lines in said second mode with detail of the scanned character; and means to which said first set of digital signals are supplied, and including means for storing sets of digital signals characteristic of known characters to be recognized for producing an output signal characteristic of a known character which is substantially similar to said first one of said characters whenever said first set of character signals substantially corresponds to the stored set of signal characteristic of said known character.

3. A system for automatically scanning and recognizing each of a plurality of characters comprising:

means for serially scanning a character in a plurality of lines not exceeding a predetermined number and generating a plurality of video signals in accordance therewith;

first means responsive to said video signals for detecting time differences between the beginnings and ends of said plurality of lines and intersections of said lines with said character to produce not more than eight binary profiling functions in accordance therewith;

second means responsive to said video signals for detecting the number of times each line within said plurality of lines intersects the character and producing a numerical internal structure function in accordance therewith;

means for storing the profiling and internal structure functions of known characters; and gating means, responsive to a signal indicative of the end of scanning said character for energizing said storing means with said produced profiling and internal structure functions and comparing them therein to produce a signal corresponding to the recognized character.

4. An apparatus for identifying a character, comprising:

first means for scanning a character with scanning lines and for generating digital character profiling and structure signals for said character, said digital character profiling signals representing the relative distances of successive lines from beginnings thereof to the first points of interception of the lines with details of said character, and the relative distances of successive lines from the last points of interception of the lines with the details of said character with the ends of said lines, and said digital character structure signals representing the number of crossings of said lines over details of said character; and storing means storing digital character profiling and structure signals of known characters, energized by the digital character profiling and structure signals of each character generated in said first means for comparing said generated signals with the signals representing known characters stored therein and for providing an output signal identifying each scanned character.

5. In a character recognition system wherein each of a plurality of characters which comprise a line of text is scanned so as to generate profiling and internal structure functions characteristic thereof which are compared with functions characteristic of known characters so as to produce output signals indicative of said scanned characters, the improvement comprising:

scanning means for scanning said line of text with a series of scanning lines in either a search sweep mode or a scanning sweep mode;

first means energizing said scanning means to scan said line of text in said search sweep mode in which scanning lines are spaced apart by a distance substantially equal to less than the line width of detail of said characters, the lengths of said scanning lines being substantially equal to N times the maximum height of the characters, N being greater than one; and second means responsive to signals produced by a first scanning line scanning the leading edge of a character in said line of text for switching said scanning means to scan said line of text in said scanning sweep mode only when said energizing signal exceeds a predetermined threshold the number of scanning lines in said scanning sweep mode being a function of character width but not exceeding X, said scanning lines in said scanning sweep mode being spaced apart by a distance greater than the line width of detail of said characters comprising said line of text.

6. A character recognizing apparatus for recognizing characters on a line of text comprising:

a flying spot scanner for scanning along a line of text comprising a plurality of characters with a series of scanning lines which sweep across a reference area including the line of text in directions perpendicular thereto, said flying spot scanner being operable in either one of two sweep modes;

first means coupled to and controlling said flying spot scanner to scan said line of text in a search mode whereby said reference area is scanned by scanning lines spaced apart by a distance substantially equal to a first predetermined ratio of the line width of detail of said characters to be recognized, said first means including;

means energized by signals produced by a first scanning line modulated by character detail, for switching said flying spot scanner to scan said line of text and the character thereon in a scanning sweep mode whereby said reference area is scanned by a series of scanning lines spaced by a distance substantially equal to a second predetermined ratio of the line width of detail of said characters to be recognized, the number of scanning lines in said series being sufficient to scan the entire character within said frame of reference but not exceeding five lines;

generating means responsive to the series of scanning lines in said scanning sweep mode, modulated by character detail for generating digital profiling functions which represent the relative time differences between the beginnings and ends of successive scanning lines within said series and the times of the first and last intersections of said character details said generating means including;

means for generating digital internal structure functions which represent the number of crossings of each scanning line in said series over said character;

means for storing digital profiling and internal structure functions of known characters;

means coupled to said generating means and said means for storing for energizing said storing means with said generated digital functions to compare them therein with the stored digital functions and produce an output signal corresponding to the scanned character; and means in said first means for switching said flying spot scanner to said search sweep mode so as to detect the leading edge of the next character in said line of text to be recognized when a scanning line in said series is not modulated by character detail or when the number of scanning lines in said series exceeds five.

7. A character recognizing apparatus for scanning a line of text to recognize characters thereon comprising:

a flying spot scanner for scanning with scanning lines a line of text, said flying spot scanner being operable in either a search mode and a scan mode;

scanner control means coupled to and energizing said flying spot scanner to scan said line of text in a search mode whereby said line of text is scanned by scanning lines spaced apart by a distance substantially equal to one-half the line widths of the characters comprising said line of text, the length of said scanning lines being substantially equal to one and one-half times the maximum height of the characters;

mode control means in said scanner control means energized by video signals which exceed a first threshold level produced by a first scanning line being modulated by the detail of the leading edge of a first character for switching said flying spot scanner to scan said line of text in a scan mode whereby said line of text with said character thereon are scanned by a series of scanning lines sufficient in number to scan the entire first character, the scanning lines being spaced apart by a distance substantially equal to one and one-half the line widths of the characters comprising said line of text, the length of said scanning lines being substantially equal to one and one-half times the maximum height of the characters;

generating means responsive to the scanning lines scanning said first character for generating digital profiling functions of said first character which represent the relative distances from the beginning and ends of said scanning lines within said series to the first and and last intersections of said scanning lines with said character, said generating means including;

means for generating digital internal structure functions which represent the number of crossings of the series of said scanning lines over said first character and means for generating a character spacing function representing the spacing between crossings of a selected scanning line over said first character;

storing means for storing digital profiling, internal structure and character spacing functions of known characters; and means included in said storing means and coupled to said generating means for energizing said storing means with the functions generated by scanning said first character to compare them with the stored functions therein, to produce an output signal representing said first character.

8. A character recognition apparatus for recognizing a character displayed in a line of text, comprising:

means for scanning with scanning lines at least one line of text wherein at least a single character is displayed and for producing a first set of digital character signals which are a function of the geometric configuration of said single character and the scanning lines, the number of scanning lines used to scan said single character being a function of its width but not exceeding a predetermined number, said first set of digital character signals including, at least one binary upper profile function whose binary value is a function of the difference in length between upper portions of two consecutively generated scanning lines, each of said upper portions being equal to the upper part of the scanning line from the beginning thereof to the point of first intersection with upper character detail of said single scanned character, at least one binary lower profile function whose binary value is a function of the difference in length between lower portions of two consecutively generated scanning lines, each of said lower portions being equal to the lower part of a scanning line from the last point of intersection of lower character detail of said single scanned character with said scanning line to the end thereof, and at least one internal structure function whose numerical value is indicative of the number of intersections of a scanning line by the character detail of said scanned character; and storing means prestoring sets of digital character signals each set characteristic of the geometric configuration of a known character with respect to said scanning lines, said storing means including means responsive to said first set of digital character signals for comparing said first set with said prestored sets and for producing an output signal whenever said first set is substantially comparable to a second set within said prestored sets of signals, said second set of digital character signals being characteristic of a known character which is substantially similar to said single scanned character.

References Cited

UNITED STATES PATENTS

| | | | |
|---|---|---|---|
| 2,615,992 | 10/1952 | Flory et al. | 179—100.3 |
| 2,616,983 | 11/1952 | Zworykin et al. | 179—100.3 |
| 3,142,818 | 7/1964 | Holt | 340—146.3 |
| 3,240,872 | 3/1966 | Relis et al. | 178—7.2 |

DARYL W. COOK, *Acting Primary Examiner.*

MAYNARD R. WILBUR, *Examiner.*

J. SCHNEIDER, *Assistant Examiner.*